Dec. 29, 1953
E. E. KESTING
2,664,341
CONTINUOUS METHOD AND APPARATUS FOR
THE PRODUCTION OF CHLORINE DIOXIDE
Filed Jan. 9, 1952
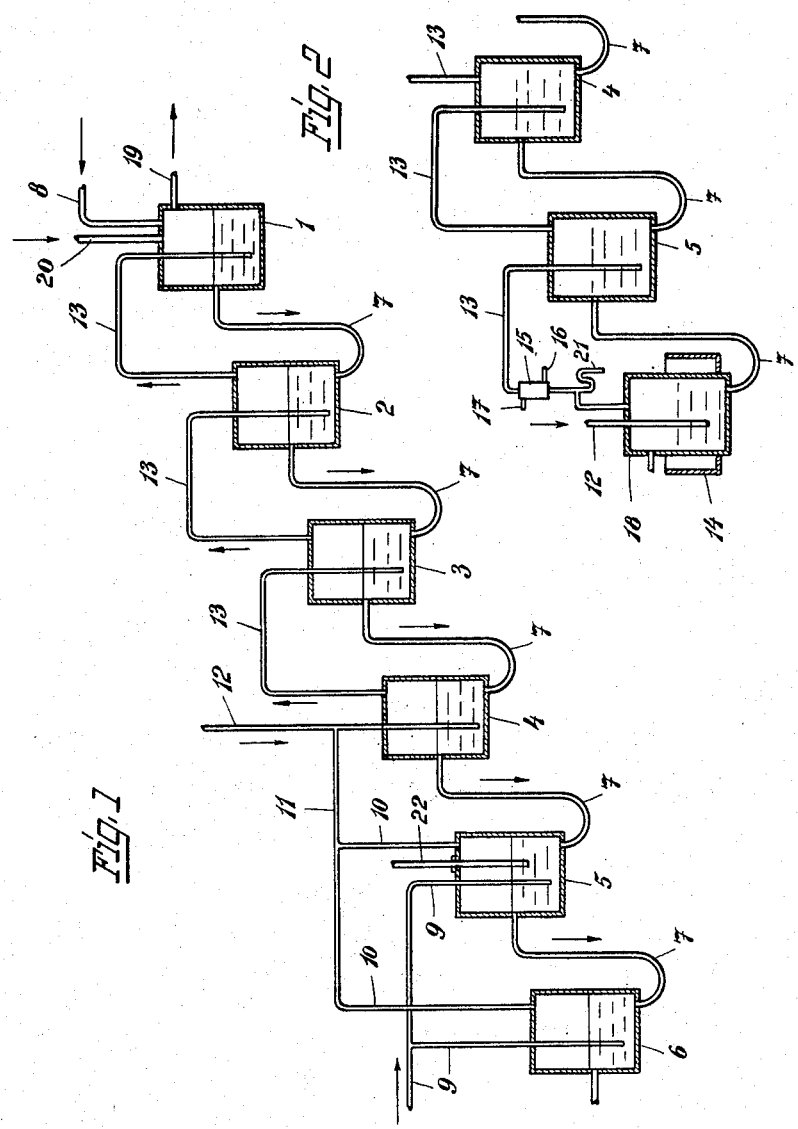
EDELBERT E. KESTING
INVENTOR
By Richardson, David and Nordon
his ATTYS.

UNITED STATES PATENT OFFICE 2,664,341

CONTINUOUS METHOD AND APPARATUS FOR THE PRODUCTION OF CHLORINE DIOXIDE

Edelbert E. Kesting, Munich, Germany

Application January 9, 1952, Serial No. 265,661

Claims priority, application Germany April 26, 1951

3 Claims. (Cl. 23—152)

This invention is directed to a new and improved method for the continuous preparation of chlorine dioxide, and to novel and improved apparatus capable of use in the carrying out of that method.

Chlorine dioxide is obtained by the reaction of an acid, generally hydrochloric acid, with a chlorate, sodium chlorate being especially employed. Inasmuch as chlorine dioxide is extremely explosive at high temperatures, up to the present time the operation has been carried out at relatively low temperatures. Despite these low temperatures, in order to obtain sufficient utilization of the chlorate and acid, and thus a sufficient yield of chlorine dioxide, there have been employed a series of overflow vessels, connected one behind the other, in each of which there takes place a conversion to form chlorine dioxide. Alternatively, the operation has been carried out in a column. In order to reduce the danger of explosion, a non-reactive (inert) gas is conducted into each vessel, this gas having for its purpose reducing the concentration of chlorine dioxide in the vessel to a non-explosive proportion.

In these presently available methods, the utilization of the chemical agents, and thus the yields of chlorine dioxide, have been unsatisfactory.

The present invention solves this difficulty by means of the surprising discovery that the reaction between and utilization of the chlorate and acid is very satisfactory at elevated temperatures, and that chlorine dioxide will not explode, even at high temperatures, if it is sufficiently diluted with a diluent gas.

In accordance with my invention, the chlorate and hydrochloric acid solutions are caused to flow through a series of consecutive reaction vessels staggered in height, one behind the other, arranged either in the form of a cascade, or as a column. In the opposite direction, a stream of inert gas is forced or drawn through the reaction vessels. For example, air or nitrogen may be supplied as a stream to the series of reaction vessels, the purpose of this being to flush out the chlorine dioxide produced in the individual vessels, and to carry it along, at the same time diluting it to non-dangerous concentrations.

The inert gas is caused to flow through the liquid by means of gas inlet pipes extending to the bottom of the vessels. The uppermost vessel is adjusted to the lowest temperature, while the lower-most vessel has the highest temperature. Under these conditions the current of gas flowing through the apparatus has the lowest concentration of chlorine dioxide in the vessel having the highest temperature, while the chlorine dioxide concentration increases in the vessels above the lowermost; the temperature becoming lower, and finally the highest chlorine dioxide concentration being obtained in the uppermost vessel wherein the lowest temperature prevails.

If the lowermost vessel is heated to a given temperature the gas leaving this vessel has a water vapor tension corresponding to the temperature in question. If this gas-steam mixture now enters into the next higher vessel of the series, it comes into a thermal equilibrium with the contents of that vessel, i. e., it heats the vessel and its contents. From there the gas current passes into the next higher vessel, heating the latter, and this is continued throughout the entire series of vessels. In this way there is obtained in the vessels a temperature gradient which automatically establishes itself, and which is dependent on the quantity of liquid, air and heat fed. If the reaction liquid is heated in this manner from vessel to vessel to a higher temperature the result is that the conversion of chlorate and acid to chlorine dioxide is very complete, and takes place with the best yield. Despite the high temperatures employed there is no danger of explosion.

Furthermore it is possible, in an extremely convenient manner, to maintain a desired given temperature gradient in the series of vessels, it being merely necessary to control the temperature at one place, for example at the place where the heat is introduced. All other temperatures are then automatically adjusted.

The attached drawing shows, schematically, in Figs. 1 and 2 thereof, apparatus arranged in cascade intended for the carrying out of the method. These cascades consist, as shown in Fig. 1, of vessels 1, 2, 3, 4, 5 and 6. Each vessel is closed, and overflow lines 7 lead from the individual vessels to the next following vessel in the series. The gas lines 13 are continued with their gas outlet ends leading to the bottom of the vessels. In vessel 1 it is intended that there prevail, for example, a temperature of 25° C.; in vessel 2 a temperature of 40° C.; in vessel 3 a temperature of 60° C.; in vessel 4 a temperature of 80° C.; and in vessels 5 and 6 a temperature of 103° C.

An aqueous solution which contains about 400 grams of sodium chlorate and about 80 grams of table salt (sodium chloride) per liter is introduced in a continuous current, in a quantity of 100 liters per hour and a temperature of about 26° C., through line 8 into the vessel 1, from where the solution passes, via the overflow line 7, into the next vessel 2. Together with the sodium chlorate solution, there is fed into vessel 1 hydrochloric acid in a quantity of 58 liters per hour, the temperature being 18° C., through line 20. The hydrochloric acid has a concentration of about 350 grams per liter. The total content of the vessels is such, and the vessels are so dimensioned, that the time the solution mixture remains in the vessels, and thus the time of reaction, is about 1 hour.

In the last two vessels, 5 and 6, steam is blown-in through steam lines 9 and the solution contained therein is heated to the boiling point. The quantity of steam blown in is so regulated that it is sufficient to heat the solution flowing through the apparatus from the initial temperature, for instance 23° C., to the boiling point, and to cover the losses arising by radiation.

Steam discharge lines 10 and 11 lead from vessels 6 and 5 into vessel 4. Into the steam discharge line 11 there discharges an air line 12, by means of which air is also fed into vessel 4, together with the waste steam from vessels 5 and 6. The quantity of air should be so dimensioned that the gas discharging from vessel 1 through conduit 19 contains ClO₂ in the desired concentration, for instance 10 volumetric percent.

Vessels 6 and 5 are heated to the boiling point, about 103° C., by the steam introduced directly through line 9. Vessel 4 is heated to 80° C. by the steam discharging and entering through lines 10 and 11 respectively, taking into consideration the cooling resulting from the admission of air. From vessel 4 a gas line 13 extends to the bottom of vessel 3, and similarly in the case of the other vessels, with the result that the gas mixture moving in counter-current relationship to the liquid heats the content of the preceding vessels 3, 2 and 1 in such a manner that each preceding vessel of the series, i. e., 3, 2, 1, has a lower temperature than the next vessel of the series.

Owing to the fact that vessels 5 and 6 are heated by direct steam admission, while the following vessels, vessels 4 to 1, are only indirectly heated, the desired temperatures are obtained in the vessels.

Other methods can also be used, of course, in order to obtain the desired temperatures in the individual vessels. For example, it is possible to do this by introducing steam directly only into the last vessel 6, or by introducing steam directly into the three last vessels 6, 5, 4, etc.

One may also proceed in such a way that the last vessel 6 is provided with an indirect heating device, i. e., instead of the introduction of steam, air is introduced in a counter-current direction directly in the last vessel 6. The heating can also be carried out by proceeding so that hot air or some other inert gas is introduced into the last vessel 6.

In any event it is not necessary to provide each individual vessel with a heating device, neither is it necessary to control the temperature in the higher vessels by special means. If the quantity of steam and the quantity of liquid, as well as the quantity of air introduced, are predetermined, the temperature in any particular vessel of the series will necessarily always be a given desired temperature. The temperatures in the apparatus can be regulated in a very simple manner, simply by installing a thermostat 22 at some suitable place, which thermostat controls the admission of steam in a known manner in such a way that the desired temperature is maintained at the place in question, as a result of which also the temperatures at all other points of the apparatus will remain constant. A prerequisite for such regulation is, of course, that the quantities of liquid and air which flow-through per unit of time shall be maintained substantially constant.

As may be observed from Fig. 2, the last vessel 18 of the cascade has a heating device 14, partially jacketing the vessel. This serves to bring the contents of vessel 18 to the boiling point, which in this case is slightly above 100° C. At the same time the steam which is necessary for the heating of the higher vessels of the cascade series is generated. It is also possible to introduce more heat by means of the heating device than is necessary for the specified purpose, in this way bringing about additional evaporation of the solution flowing through. Air line 12 leads into vessel 18. A steam and air discharge line, 13, leads from vessel 18 to vessel 5. Inasmuch as the generated vapor passing into vessel 5, due to its quantity, would heat the upper vessel excessively, and interfere with the desired concentration effect, a condenser 15 having admission conduit 16 and discharge conduit 17 for cooling liquid is provided in the air-steam line 13, extending from vessel 18 to vessel 5, this condenser serving to condense a part of the steam generated, discharging the condensate as water through a syphon 21. In this way the quantity of steam passing into vessel 5 is metered. This arrangement has the advantage that any quantity of liquid for which the apparatus is adjusted can be continuously drawn-off by the condenser. It is possible, in this way, simultaneously to concentrate the reaction liquid passing-through to a liquid of smaller volume.

Fig. 1 illustrates schematically a series of vessels, arranged in cascade relationship, and the liquid and gas inlet and exit conduits leading to and from these vessels. Fig. 2 represents a modified form of apparatus in which the last vessel of the cascade series, vessel 18 (replacing vessel 6 of the arrangement shown in Fig. 1), is provided with a jacket, partially extending around the vessel, through which jacket a heating fluid may be supplied for the purpose of heating the vessel and its contents.

Various changes and modifications may be made in my improved method and the apparatus for carrying out that method, certain preferred forms of which have been herein described, without departing from the spirit or scope of the invention. To the extent that they are included within the purview of the appended claims, they are to be regarded as within the scope of my invention.

I claim:

1. The method of continuous production of chlorine dioxide by the reaction of a solution of a chlorate and an acid in an apparatus of the type comprising a series of vessels arranged at relatively descending levels and overflowing each into the vessel next beneath, including the steps of heating from an external source of heat only the lowermost vessel of said series, admitting an inert gas into said lowermost vessel, conducting said gas in counter-current flow direction relative to the direction of flow of said solution, through said solution in the individual vessels of said series, and removing said gas together with the chlorine dioxide produced in said series of vessels, from the uppermost vessel of said series, whereby the degree of heat will be relatively greater in the vessels having a low concentration of chlorine dioxide, than in the vessels having a higher concentration of chlorine dioxide.

2. The method according to claim 1, wherein the said inert gas passing in counter-current direction is heated before admission to said apparatus and is introduced into at least one of said vessels chosen from those lying in the lower levels of said series.

3. The method according to claim 1, in which steam is introduced into at least one of the lower level vessels and a non-condensing gas is introduced into the vessel next above said lower level vessel in said series.

EDELBERT E. KESTING.

References Cited in the file of this patent

UNITED STATES PATENTS

| Number | Name | Date |
|---|---|---|
| 642,620 | Mather | Feb. 6, 1900 |
| 914,224 | Aylsworth | Mar. 2, 1909 |
| 1,264,511 | Hechenbleikner | Apr. 30, 1918 |
| 1,271,633 | Walker | July 9, 1918 |
| 2,131,447 | Logan | Sept. 27, 1938 |
| 2,196,594 | Muskat | Apr. 9, 1940 |
| 2,481,240 | Rapson et al. | Sept. 6, 1949 |

FOREIGN PATENTS

| Number | Country | Date |
|---|---|---|
| 452,302 | Great Britain | Aug. 20, 1936 |